March 17, 1964  B. T. COON ETAL  3,125,420
COMPACT REACTOR FOR PRODUCTION OF FERTILIZER SOLIDS
Filed Dec. 5, 1960
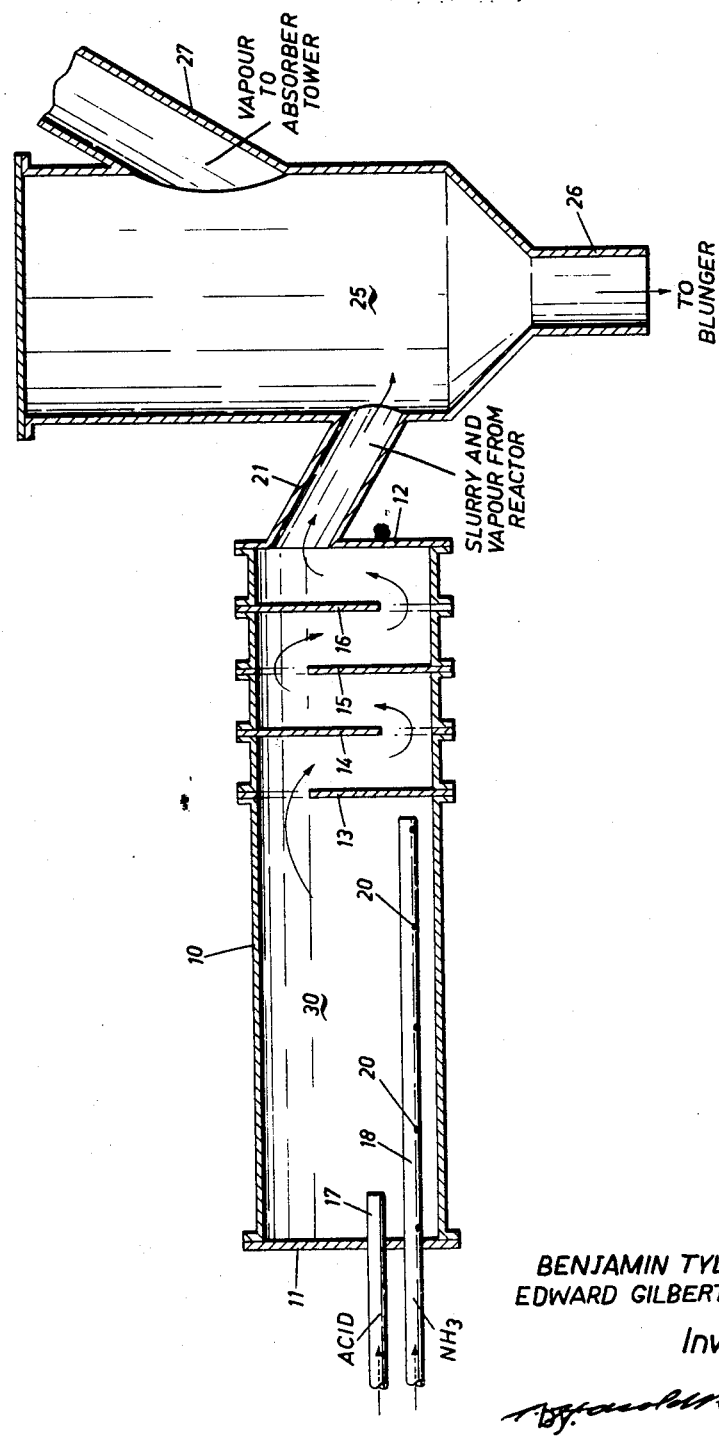
BENJAMIN TYLER COON
EDWARD GILBERT WILTSHIRE
Inventors
Attorney United States Patent Office 3,125,420
Patented Mar. 17, 1964

3,125,420
COMPACT REACTOR FOR PRODUCTION OF FERTILIZER SOLIDS
Benjamin Tyler Coon and Edward Gilbert Wiltshire, Rossland, British Columbia, Canada, assignors to The Consolidated Mining and Smelting Company of Canada Limited, Montreal, Quebec, Canada, a corporation of Canada
Filed Dec. 5, 1960, Ser. No. 73,637
3 Claims. (Cl. 23—259.1)

This invention relates to a method and apparatus for conducting chemical reactions. It is particularly directed to providing a method of conducting an exothermic chemical reaction such as that which occurs in reacting an alkali and an acid in a flowing, confined stream to produce a solution which contains solid, precipitated particles in suspension with concurrent generation of heat. More particularly, it is directed to providing a novel method and apparatus for producing chemical fertilizers.

Processes are known for mixing fluid reactants in an agitated vessel to produce a reaction mixture comprised of a solution with particles of precipitated solids suspended therein. For example, in the production of chemical fertilizer, such as ammonium phosphate, ammonia and phosphoric acid are reacted in a series of agitated vessels to produce ammonium phosphate. The resulting mixture or slurry of solution and suspended solids is passed to a granulating device, such as an elongated, trough-shaped vessel, provided with rotating shafts on which are mounted fixed blades, known as a blunger, for granulating the ammonium phosphate. The salt particles are then dried. Fines and oversize particles are separated from the product, for example, by screening.

The latter process and apparatus are used to produce an acceptable product on a commercially practical basis. There are, however, several serious disadvantages to this process. The agitators or vessels used for the reaction have a relatively small throughput with regard to their size. For example, three large agitator vessels are required in a typical commercial installation to produce about 250 tons of ammonium phosphate per day. Also, a large motor is necessary to drive the agitator provided for each vessel. The autogenous heat generated by the neutralizing reaction throughout the large volume of material in each vessel, which might be utilized for improving the rate of production, is dissipated to a considerable extent as a result of steam and ventilation air being withdrawn from the vessel. In addition, solids tend to accumulate at the top and sides of the vessel, thus making it necessary to interrupt the reaction at intervals, if operated on a continuous basis, to permit cleaning accumulated solids from the vessel.

We have found that disadvantages inherent in the operation of exothermic chemical reactions involving fluid reactants conducted in an agitated vessel in which a reaction product is produced comprised of solid particles and solution can be overcome by conducting these reactions in a confined, turbulent bed of solution and suspended, precipitated solids. In our improved process, heat generated during the reaction is usefully employed to provide at least part, and preferably all, the turbulence or agitation necessary for maintaining a rapid production rate and for retaining the precipitated solids or salt particles in suspension in the solution as the mixture is advanced through the reactor used in the process. The process and apparatus of this invention are particularly applicable for reacting an inorganic acid and an alkali to produce a salt and an aqueous solution with concurrent generation of heat which is employed with advantage to maintain the reaction mixture in a turbulent state and thus obtain best results from the reaction and retain the salt in suspension in the solution during its passage through the apparatus.

The process of this invention for producing chemical fertilizer by reacting an alkali and an acid selected from the group consisting of sulphuric acid and phosphoric acid with concurrent generation of steam comprises, in general, the steps of:

(a) Separately feeding said acid and alkali into the inlet end of a reaction vessel having an unobstructed reaction zone at the inlet end and a discharge zone at the outlet end thereof;

(b) Reacting said acid and said alkali in said unobstructed reaction zone in a flowing, confined stream of reaction mixture comprising solution and suspended solids formed by said reaction;

(c) Utilizing steam generated in said reaction to maintain the flowing stream of reaction mixture in a turbulent state;

(d) Passing reaction mixture and steam from the reaction zone to the discharge zone;

(e) Passing reaction mixture and steam through the discharge zone in a tortuous, confined, turbulent stream;

(f) Discharging reaction mixture and steam from the discharge zone;

(g) Separating steam from the reaction mixture;

(h) And thereafter treating said reaction mixture to separate and recover chemical fertilizer solids therefrom.

An understanding of the process and apparatus which forms the subject matter of this invention can be obtained from the following description, reference being made to the drawing which illustrates, schematically, a preferred embodiment of the invention.

The invention is described in detail hereinafter as applied to the production of ammonium phosphate in which liquid or gaseous ammonia is reacted with an aqueous phosphoric acid solution. It will be understood that it can be employed with advantage for other chemical reactions in which at least two fluids are reacted to produce a reaction product comprised of a solution and solid particles of a precipitated salt.

Referring to the drawing, the numeral 10 indicates a pipe or conduit. It can be of polyangular or oval section but, preferably, is of circular section. It is formed, preferably, of rigid material capable of withstanding the external and internal stresses and loads to which it is subjected. The interior wall of the pipe preferably is formed of such material as stainless steel, capable of resisting corrosion and erosion through attack by the reactants or by the reaction mixture. Subject to the foregoing requirements, other conventional or unconventional construction materials can be employed if desired. The reactor can be positioned at an angle to the horizontal but it is found that the best results are obtained when it is positioned in a horizontal plane.

The pipe 10 is formed with an inlet end 11 and an outlet end 12. That portion of the pipe 10 near the inlet end 11 forms the elongated reaction zone 30, which is separated from the outlet end 12 by alternately spaced, upwardly and downwardly extending full-width baffles. The baffles ensure continuance of the mixing initiated in the reaction zone and therefore completion of the reaction, with consequent increase in efficiency and yield, and production of a more uniform product. In the modification of the pipe illustrated, four baffles are employed. The upstanding first and third baffles 13 and 15 extend from the bottom of the pipe toward but terminate below the top. The downwardly extending second and fourth baffles 14 and 16 extend from the top of the pipe toward but terminate above the bottom. The spaces or areas between the free end of each of the baffles and the opposing walls of the pipe 10 preferably are equal, or approximately equal, to the cross-sectional area of the outlet 21. Although a single, upwardly extending baffle can be used, operation with one or more pairs of alternately upwardly and downwardly extending baffles, and usually at least two pairs, is preferred. The effect of the baffles is to cause the turbulent reaction mixture to flow as a tortuous, confined stream from the reaction zone 30 to the outlet 21. This effect can be created by other means, of course, such as by using a single, continuous, helical baffle, not shown, with its inlet end extending upwardly and its outlet end extending downwardly.

Inlet tubes 17 and 18 are provided at the inlet end 11 of the pipe 10 for feeding, in the production of ammonium phosphate fertilizer, phosphoric acid and ammonia respectively into the pipe 10. These inlet tubes are connected to sources of supply exterior of the pipe 10. Usually, the reactor is equipped with more than two inlet tubes to provide for the supply of additional reactants and for the injection of steam and water for cleaning purposes.

In the embodiment of the apparatus illustrated in the drawing, the inlet tube 17 is merely an open end tube but orifices can be provided, if desired, to obtain finer dissemination of the reactants. The inlet tubes can be positioned in spaced apart relation as shown or they can, if desired, be positioned concentrically, one within the other. Also, if desired, one, 18, as shown or both of the inlet tubes can be of the cracker type. This type of inlet tube is provided with a plurality of spaced openings 20 and extends to a point adjacent to the first baffle 13 to discharge reactant at spaced intervals along the reaction zone and employ the reactant or reactants to agitate the mixture therein and thus improve the mixing and yield of desired product in addition to reducing corrosion and erosion.

Reaction mixture or slurry is discharged from the reactor to a separator 25 through an outlet 21 provided in the outlet end 12. The diameter of the outlet end can be readily determined having regard to the nature of the reaction mixture and the desired production rate, having regard to the fact that it may be desired to retain steam formed by the heat autogenously generated by the reaction with the reaction mixture as long as possible. Outlet diameters of 2, 4, 6 and 8 inches have been found satisfactory with a reactor having a diameter of 12 inches.

The separator vessel can be as shown, a cylindrical vessel having a bottom 26 in the form of a truncated cone from which slurry is discharged to a conventional granulating device, not shown, such as a blunger. Vapour occluded in the slurry is released and rises to the surface in the vessel 25 and is withdrawn therefrom through an outlet 27 in the upper part of the vessel and passed to a conventional absorber for the separation and recovery of any economically recoverable and/or atmosphere polluting constituents.

The process which forms the subject matter of this invention is described hereinafter as employed for the production of ammonium phosphate. The term "ammonium phosphate" is intended to include mono- and di-ammonium phosphate of conventional 11–48–0 and 16–48–0 grade fertilizers and ammonium phosphate-sulphate fertilizer of, for example, 16–20–0 grade. It will be understood, of course, that the process can be employed with the same advantages for other exothermic reactions involving inorganic acids and alkalies, such as in the production of ammonium sulphate fertilizer.

In the normal operation of a specific unit of a conventional process for the production of ammonium phosphate fertilizer, at the rate of about 250 tons per day, ammonia and phosphoric acid, the latter usually containing a small amount of sulphuric acid, were fed separately, in substantially stoichiometric amounts to produce ammonium phosphate, into the first of three reaction agitators, of which the first two were six feet in diameter and seven feet high and the third was eight feet in diameter and nine feet high. An agitator driven by a 20 horsepower electric motor was provided in each agitator vessel. The reaction was initiated in the first agitator and was substantially completed in the second agitator. The third agitator functioned primarily as a surge tank.

The three conventional agitator vessels were replaced by the apparatus of this invention. It was found that the same production rate was obtained by the use of a pipe six feet long and one foot in diameter. The reaction zone was four feet long and the four baffles were spaced six inches apart commencing four feet from the inlet end. On a vertical diameter, the height, or depth of each baffle, as the case might be, was 7½ inches, leaving a segment measuring 4½ inches between the top or bottom of each baffle and the opposing internal wall of the pipe. Thus, the reaction zone is actually a shallow bed comprised of reaction mixture in contrast to that in reaction agitators wherein the depth of reaction mixture may be from five to seven feet or more. The outlet for the production of 11–48–0 grade ammonium phosphate was six inches in diameter but in the production of 16–20–0 grade it was necessary to increase the diameter to eight inches. The reaction in either case was strongly exothermic, the temperature throughout the reaction and baffled discharge zones being maintained autogenously above 105° C. with a normal operating pressure of from about one to five pounds per square inch. The steam generated in the reaction was retained in the pipe and served to maintain the reaction mixture in a turbulent state during its passage through the reaction and baffled discharge zones. The steam and other vapours were discharged in admixture with the slurry from the outlet 21 and were separated therefrom in the vessel 25. Slurry from the vessel 25 was passed to a conventional granulating device, not shown. Ammonium phosphate granules discharged from the granulating device were dried and sized according to conventional practice.

If the heat autogenously generated is insufficient to maintain the practicable operation of the reaction as may occur, for example, when a relatively high proportion of unreactive ammonium sulphate solution or potassium chloride solution is added with the acid-alkali reactants, such expedients as an insulated reactor-jacket, a steam reactor-jacket, or direct injection of steam into the reactor, can be utilized to ensure the reaction mixture is maintained in a turbulent state.

Preferably, the process is operated continuously. Although the inlet tubes for the reactants may occupy part of the reaction zone, that zone is otherwise unobstructed by baffles or the like.

The process and apparatus of the present invention possess a number of important advantages. The reactor is small and can be manufactured inexpensively from readily available, conventional materials. In the modification of the invention described above, a production rate of 250 tons per day of commercially acceptable ammonium phosphate was achieved with a reactor 12 inches in diameter and with an overall length of six feet and having a total volume of only 4.7 cubic feet with a time of retention of from about 15 to about 60 seconds depending on the product and the reaction rate. In order to obtain the same production with conventional agitator vessels, assuming the reaction occurred in the first two of the three vessels described above, a capacity of 396 cubic feet was required and the trend, in recently constructed plants for the same process, is to even larger agitator vessels to obtain greater freedom from operational fluctuations.

An important advantage of this reactor and process for the production of chemical fertilizers is that the violent turbulence ensures self-cleaning operation and therefore, no problem is encountered by the precipitation and accumulation of solids. The heat autogenously generated in the reaction is retained within the reactor and is usefully employed to maintain the reaction mixture in a turbulent state, thus to obviate the necessity of providing mechanically actuated agitators with ancillary apparatus. It is found, also, that the baffles serve to prevent backmixing of completely reacted materials with unreacted materials, thus ensuring the production of a product which is of substantially uniform quality throughout. The small uniform particles produced by the process lend themselves to ready building into suitably sized granules. The process and apparatus are very flexible which is important in the production of complex chemical fertilizers in that different products and different grades of products can be produced by merely varying the reactants or the amounts of reactants which are supplied to the reaction zone.

It will be understood, of course, that modifications can be made in the preferred embodiment of the process and apparatus described herein without departing from the scope of the invention defined by the appended claims.

What we claim as new and desire to protect by Letters Patent of the United States is:

1. Apparatus for the production of chemical fertilizer solids which comprises an elongated reactor having a diameter less than its length and generally uniform in cross section, said reactor having an inlet end, an outlet end, an elongated, unobstructed reaction zone extending from said inlet end and constituting the major portion of the length of said reactor, a baffled discharge zone extending between said reaction zone and said outlet end, said baffled discharge zone comprising alternately spaced, upwardly and downwardly extending baffles with spaces between the free ends thereof and the opposing walls of the reactor, conduit means for separately feeding fluid reactants into said reactor at the inlet end thereof, and conduit means for discharging reaction mixture from the outlet end, whereby agitation of the mixture in said reactor is effected by steam generated by the reaction taking place therein.

2. Apparatus for the production of chemical fertilizer solids which comprises an elongated reactor having a diameter less than its length and generally uniform in cross section, said reactor having an inlet end, an outlet end, an elongated, unobstructed reaction zone extending from said inlet end and constituting the major portion of the length of said reactor, a baffled discharge zone extending between said reaction zone and said outlet end, said baffled discharge zone comprising alternately spaced, upwardly and downwardly extending baffles with spaces between the free ends thereof and the opposing walls of the reactor, conduit means for separately feeding fluid reactants into said reactor at the inlet end thereof, at least one of said conduit means extending into said reaction zone and having a plurality of openings at spaced intervals along the portion thereof within said reaction zone, and conduit means for discharging reaction mixture from the outlet end, whereby agitation of the mixture in said reactor is effected by steam generated by the reaction taking place therein.

3. Apparatus for the production of chemical fertilizer solids which comprises an elongated reactor having a diameter less than its length and generally uniform in cross section, said reactor having an inlet end, an outlet end, an elongated, unobstructed reaction zone extending from said inlet end and constituting the major portion of the length of said reactor, a baffled discharge zone extending between said reaction zone and said outlet end, said baffled discharge zone comprising alternately spaced, upwardly and downwardly extending baffles with spaces between the free ends thereof and the opposing walls of the reactor, conduit means for separately feeding fluid reactants into said reactor at the inlet end thereof, and a conduit having a cross sectional area about equal to the area between the free end of each of said baffles and the opposing wall of the reactor for discharging reaction mixture from the outlet end, whereby agitation of the mixture in said reactor is effected by steam generated by the reaction taking place therein.

References Cited in the file of this patent

UNITED STATES PATENTS

| | | |
|---|---|---|
| 1,677,324 | Beck et al. | July 17, 1928 |
| 2,229,610 | Nicholoy | Jan. 21, 1941 |
| 2,460,083 | Harbaugh | Jan. 25, 1949 |
| 2,618,547 | Davenport et al. | Nov. 18, 1952 |
| 2,845,936 | Boynton et al. | Aug. 5, 1958 |
| 2,902,342 | Kerley | Sept. 1, 1959 |